J. D. PARROT.
Revolving Harrow.
No. 50,729. Patented Oct. 31, 1865.
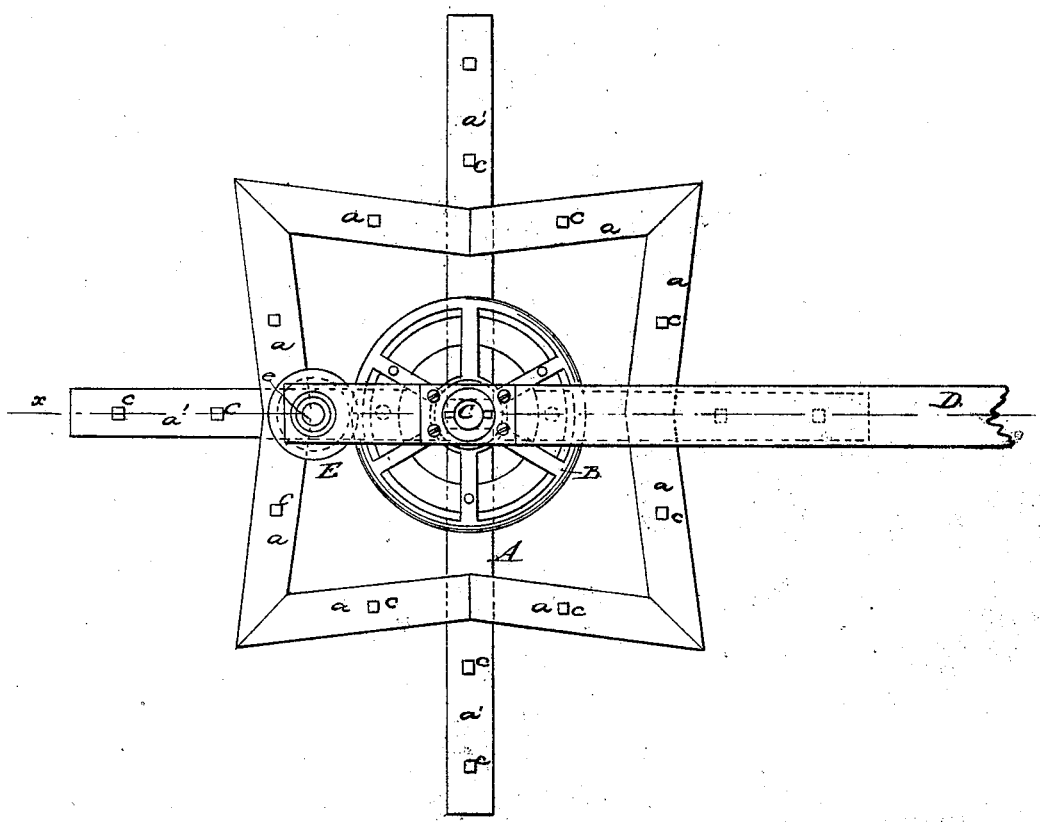
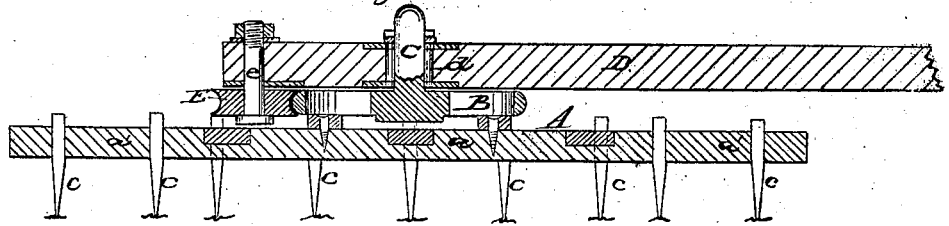

UNITED STATES PATENT OFFICE.

J. D. PARROT, OF MORRISTOWN, NEW JERSEY.

IMPROVEMENT IN ROTARY HARROWS.

Specification forming part of Letters Patent No. 50,729, dated October 31, 1865.

*To all whom it may concern:*

Be it known that I, J. D. PARROT, of Morristown, in the county of Morris and State of New Jersey, have invented a new and Improved Harrow; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a side sectional view of the same, taken in the line $x\ x$, Fig. 1.

Similar letters of reference indicate corresponding parts.

This invention relates to a new and improved harrow of that class which are allowed to rotate when coming in contact with any obstruction, and thereby allowed to clear or free themselves.

The invention consists in having a wheel attached to the rear end of the draft-pole, to bear against a wheel attached permanently to the harrow, said wheel being provided with a central spindle, which passes through an oblong slot in the draft-pole, and all arranged as hereinafter fully shown and described, whereby the harrow under the draft movement is left free to rotate and clear itself from obstructions.

A represents the harrow, which is constructed of timbers $a$, framed together in such a manner as to form points—four, more or less—with radial bars or timbers $a'$ projecting from its center. These timbers have teeth $c$ driven into or through them at proper points, and these parts form the harrow.

On the top of the harrow, at its center, there is attached permanently a wheel, B, provided with an upright fixed spindle, C, which passes through an oblong slot, $d$, in the draft-pole D, and to the rear end of the draft-pole there is secured a wheel, E, which is allowed to turn freely on its axis $e$, said wheel having a grooved or concave periphery, which works or bears against the convex periphery of the wheel B, as shown clearly in Fig. 2. When the harrow is drawn along the pull on the latter is through the wheel E, which bears against the wheel B, (there is no pull or strain on the spindle C, for that serves simply as a guide for the draft-pole to keep it in place,) and the oblong slot $d$ is designed to prevent the draft bearing against the spindle.

In case the harrow meets with any obstruction as it is drawn along, it will of course turn and free itself, so that it cannot become choked or clogged.

The device is extremely simple, and may be constructed at a small cost.

Having thus described my invention, I claim as new and desire to secure by Letters Patent—

The wheel B, attached permanently to the harrow, and provided with a spindle, C, which passes through an oblong slot, $d$, in the draft-pole D, in connection with the wheel E at the rear end of the draft-pole, bearing against the fixed wheel B, substantially as and for the purpose herein set forth.

J. D. PARROT.

Witnesses:
DANIEL H. BREESE,
THOMAS F. CLIFFORD.